(12) United States Patent
Stephens, Jr.

(10) Patent No.: US 8,700,663 B2
(45) Date of Patent: Apr. 15, 2014

(54) CONTEXTUAL KEYWORD-BASED ACCESS CONTROL

(75) Inventor: James H. Stephens, Jr., Austin, TX (US)

(73) Assignee: Empire Technology Development LLC, Wilmington, DE (US)

( * ) Notice: Subject to any disclaimer, the term of this patent is extended or adjusted under 35 U.S.C. 154(b) by 234 days.

(21) Appl. No.: 12/536,411

(22) Filed: Aug. 5, 2009

(65) Prior Publication Data

US 2010/0036836 A1 Feb. 11, 2010

Related U.S. Application Data

(60) Provisional application No. 61/086,639, filed on Aug. 6, 2008.

(51) Int. Cl.
*G06F 17/30* (2006.01)

(52) U.S. Cl.
USPC .............................. 707/781; 707/785; 707/783

(58) Field of Classification Search
USPC .................. 707/781, 783, 785, 777, 754, 741
See application file for complete search history.

(56) References Cited

U.S. PATENT DOCUMENTS

| | | | |
|---|---|---|---|
| 6,587,849 B1 * | 7/2003 | Mason et al. ......................... | 1/1 |
| 2003/0050929 A1 | 3/2003 | Bookman et al. | |
| 2005/0216457 A1 * | 9/2005 | Walther et al. ..................... | 707/4 |
| 2006/0198504 A1 * | 9/2006 | Shemisa et al. .......... | 379/201.02 |
| 2007/0011155 A1 * | 1/2007 | Sarkar ............... | 707/5 |
| 2007/0150299 A1 * | 6/2007 | Flory ................. | 705/1 |
| 2007/0156636 A1 * | 7/2007 | Norton et al. .................... | 707/1 |
| 2007/0250901 A1 * | 10/2007 | McIntire et al. .............. | 725/146 |
| 2008/0005064 A1 * | 1/2008 | Sarukkai ........................ | 707/3 |
| 2008/0022370 A1 * | 1/2008 | Beedubail et al. ................ | 726/4 |
| 2008/0066185 A1 * | 3/2008 | Lester et al. .................... | 726/27 |
| 2008/0172446 A1 * | 7/2008 | Donovan et al. ............ | 709/202 |
| 2009/0132285 A1 * | 5/2009 | Jakobovits ........................ | 705/3 |
| 2010/0223261 A1 * | 9/2010 | Sarkar ........................ | 707/726 |
| 2011/0173141 A1 * | 7/2011 | Campbell et al. ............ | 715/230 |

OTHER PUBLICATIONS

International Preliminary Report on Patentability for International Application No. PCT/US2009/004514 mailed on Feb. 17, 2011.
International Search Report and Written Opinion for International Application no. PCT/US2009/004514 mailed on Sep. 24, 2009.
GetNetWise, "Keyword-Based Filters," Internet Education Foundation, 1999-2008, pp. 1-2, http://kids.getnetwise.org/tools/proscons/keywordfilters.
"Role-Based Access Control," Wikipedia Foundation, Inc. pages 1-4, http://en.wikipedia.org/wiki/Role_based_access_control.

(Continued)

*Primary Examiner* — Rehana Perveen
*Assistant Examiner* — Tiffany Thuy Bui

(57) ABSTRACT

Various implementations for contextual keyword-based access control are disclosed comprising one or more methods, systems, computer-readable media comprising instructions, and devices for annotating content with keywords, assigning a user to a group, associating the group with the keywords in a context and determining a privilege for the user to access the content based on the keywords, the context and the group.

10 Claims, 4 Drawing Sheets

(56) References Cited

OTHER PUBLICATIONS

Gollu, Kiran K. et al., "A Social Networking-Based Access Control Scheme for Personal Content," University of Toronto and Microsoft Research, pp. 1-1, http://www.cs.toronto.edu/~kkgollu/docs/kkgollu_access.pdf.

Hart, Michael Andrew, "Content-Based Access Control," May 2011, ProQuest LLC, pp. 1-225, http://gradworks.umi.com/34/60/3460588.html.

Wikipedia, Role-Based Access Control, Wikipedia Foundation, Inc., pp. 1-4, accessed online via http://en.wikipedia.org/wiki/Role_based_access_control on Jan. 13, 2012.

Gollu, Kiran K. et al., A social networking-based access control scheme for personal content, University of Toronto and Microsoft Research, pp. 1-1, accessed online via http://www.cs.toronto.edu/~kkgollu/docs/kkgollu_access.pdf on Jan. 30, 2014.

* cited by examiner

300 A computer program product.

302 A signal bearing medium.

304 at least one of one or more instructions for receiving a request to access content in a context, wherein the request includes information specifying a user and wherein the content has been annotated with a keyword;

one or more instructions for providing access to the content based on the user belonging to a group associated with the keyword;

one or more instructions for retrieving a privilege, wherein the privilege comprises a tuple and wherein the tuple specifies the content, the context, and the user;

one or more instructions for determining an index specifying the group and/or the user;

one or more instructions for retrieving the privilege in response to the index;

one or more instructions for searching the content using the keyword; or one or more instructions for filtering the content based on a privilege.

306 a computer-readable medium.

308 a recordable medium.

310 a communications medium.

FIG. 3

CONTEXTUAL KEYWORD-BASED ACCESS CONTROL

RELATED APPLICATION

This application claims priority to U.S. Provisional patent application Ser. No. 61/086,639, filed Aug. 6, 2008, and entitled "Method and System for Contextual Keyword-Based Access Control", the entire disclosure of which is incorporated herein by reference.

BACKGROUND

Information systems may use some form of access control to determine what each of the system's users can do. Some access control systems are coarse-grained, employing a large-scale specification defining various permissions for users. In contrast, fine-grained access control systems, may undertake decisions with more detail and smaller scope. To provide fine-grained behavior, an access control system may grant (or deny) access for specific users or groups to specific items of interest in different contexts.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 3 illustrates an example computer program product; and

DETAILED DESCRIPTION

Figure 1:
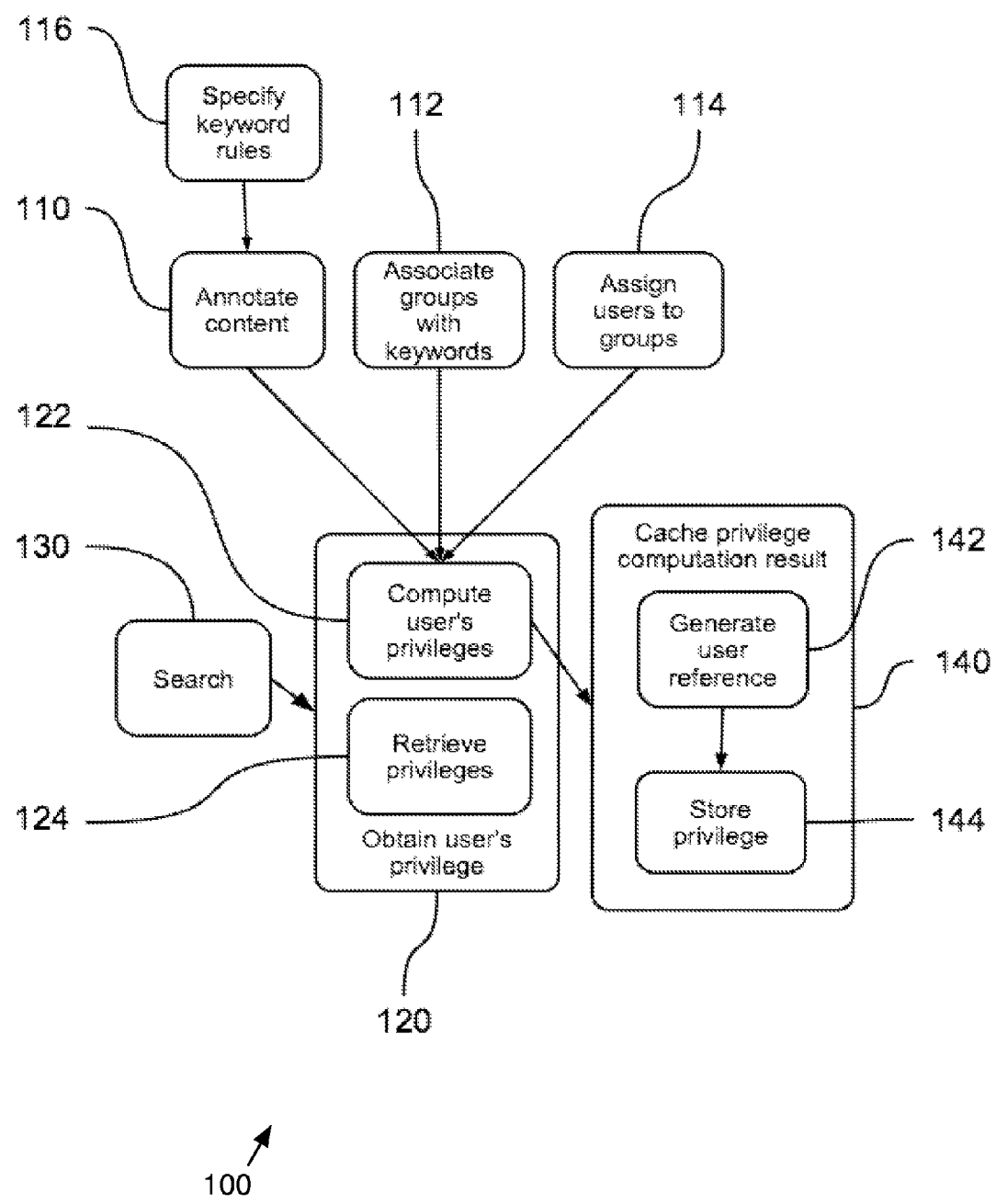
FIG. 1 is a flow chart illustrating an example process.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, and systems related to access control in an information system. More specifically, some implementations may be described in reference to one or more functions, operations or actions such as annotating content with keywords, associating groups with keywords, assigning users to groups, computing privileges, and/or storing results of such activities.

In this description, the term "content" may be used to designate any entity, document, datum, pointer, and/or similar identifiable object or reference to such an object. The term "keyword" may be used to denote any data, including references, associated with content. Synonyms for the term "keyword" may include, but are not limited to, "tag", "property", and/or "metadata". Similarly, the term "context" may be used to specify an additional parameter, which may denote, directly or indirectly, a scope such as an account, topic, qualification, perspective, region, and/or constraint to name several non-limiting examples.

In accordance with the present disclosure, content may be annotated with keywords, which may facilitate search and navigation. One or more users may provide such annotations. Alternatively or in addition, keywords for content may be derived or extracted from data associated with that content or from the content itself. Furthermore, users, administrators, or both may specify rules for keyword implication, where a keyword may be specified to imply another keyword. In some implementations, a user may specify keyword annotations. In various implementations, keywords may be specified using implied keyword rules, from the extraction of keywords from content or data associated with the content, or from a combination of one or more of these techniques.

In accordance with the present disclosure, for a given access right, such as "can edit" or "can view", keywords may be associated, in a particular context, with one or more groups of users. A user group may contain one or more users. In some implementations, a context may be a universal context. In other implementations a context may represent a smaller scope. As noted above, users, administrators, or both may specify keyword to context associations in various implementations. Such keyword-to-context mapping may facilitate dual use for keywords: access control as well as search. For example, if a user annotates content with keyword(s) to facilitate searching of the content, corresponding access control may be derived from the user specified annotation.

In general, in accordance with the present disclosure, content C's groups {G}, associated with content C by keywords {K}, may be used to determine if a given user U has some right R to access content C in context W. In some implementations, user U may be granted right R to access content C if user U is in the intersection of the groups {G}.

To support the ability to provide access control independent of keywords, some implementations may allow for overriding keyword-based access control. In some implementations explicit rights for groups for particular content may be provided.

In some implementations, privileges may be predetermined in order to facilitate queries or other operations that may determine access rights for a user. In accordance with the present disclosure, some implementations may generate a user index $n_{UW}$, such as an integer (or similar token, scalar, or datum), for each user U authorized for a given context W. Since both the user and the context may be provided when access is to be determined, some implementations may use an abbreviated reference for the user in that context. Similarly, some implementations may be adapted to generate a group index $m_{GW}$, such as an integer (or similar token, scalar, or datum), for each group G authorized for a given context W. References to content with a context may be abbreviated similarly. In some implementations, tuples representing privileges may be partitioned to facilitate concurrent access.

FIG. 1 is a flow chart of an example process 100 for contextual keyword-based access control, arranged in accordance with at least some examples of the present disclosure. Process 100, and other processes described herein, set forth various functional blocks that may be described as processing operations, functional operations, events and/or actions, etc., and that may be performed by hardware, software or any combination thereof. Process 100 may include one or more operations, functions or actions as depicted by blocks 110, 112, 114, 116, 120, 122, 124, 130, 140, 142, and/or 144. Those skilled in the art in light of the present disclosure will recognize that numerous alternatives to the functional blocks shown in FIG. 1 may be practiced in accordance with claimed subject matter.

Although claimed subject matter is not limited in this regard, an apparatus, such as a computer, employing a processor, may execute instructions to implement the functional blocks of process 100 as will be described in further detail below. In some implementations, a first computer undertaking process 100 may receive content from a second computer, and a third computer may access the first computer to determine a user's rights with respect to some or all of the received content.

In block 110, annotate content, content may be annotated with keywords {K}. Generally speaking, block 110 may be viewed as providing a mapping between content C and one or more keywords as follows:

$$C \rightarrow \{K\}$$

In various implementations different sources may provide keyword annotations for content in block 110. For example, in some implementations, a user may explicitly specify the association of content with certain keywords in block 110. Keywords specified by users for use in annotation may be referred to as user-specified keywords $\{K_U\}$. In various implementations, annotation of keywords in block 110 may be derived from content itself and/or from data associated with the content. Keywords used in annotation and derived from content and/or data associated with content may be referred to as content-derived keywords $\{K_C\}$.

Further, in various implementations, annotation of keywords in block 110 may be implemented using implied keyword rules. The generation of implied keyword rules will be described in further detail below with respect to block 116, specify keyword rules. Keywords for use in annotation and implied by keyword rules may be referred to as implication-specified keywords $\{K_I\}$. For example, if particular content has been annotated with the keyword "hummingbird" and if implied keyword rules linking the keyword "hummingbird" to the keywords "bird" (i.e., hummingbird→bird) and "animal" (i.e., hummingbird→animal) exist, then "bird" and "animal" may be implied keywords for that content. Note that, again, a "keyword" is not limited to a word or even a phrase as in the above examples. Instead, in various examples, many different types of data may serve as a keyword.

In block 112, associate groups with keywords, a keyword K may be associated with one or more groups {G} in a context W for a given right R. In some implementations a right R may be implicit. Generally speaking, block 112 may be viewed as providing a mapping between a keyword and one or more groups as follows:

$$K \rightarrow_{W,R} \{G\}$$

In block 114, assign users to groups, a group {G} may be associated with a user U in a context W. In some implementations block 114 may involve assigning a user to one or more groups in a given context. In some implementations block 114 may involve assigning a user to a group having global access. Generally speaking, block 114 may be viewed as providing a mapping between a group and one or more users as follows:

$$G \rightarrow_W \{U\}$$

In block 122, obtain user's privilege, user privileges may be computed or determined. In some implementations, block 122 may include providing access to content based on a determined privilege where that privilege allows a user to access content when the user belongs to a group associated with the one or more keywords in block 112. In general, implementation of block 122 may answer the question, "Does user U have right R for content C in context W?" In some implementations, this question may be addressed according to whether user U is in the intersection of the groups $\{G_C\}$ as related to content C via the mappings described above. Some implementations of block 122 may involve generating the answer to this question based on other set operations, such as set union, involving $\{G_C\}$. In addition, some implementations may provide for overriding the computed result with an explicit mapping of content directly to groups $\{G_D\}$. In this case, these directly-associated groups may be consulted instead.

Note that blocks 110, 112 and 114 may be performed in any sequence. Further each of blocks 110, 112 and 114 may be undertaken independent of the rest. In some implementations block 110 may be performed after block 116.

In block 130, search, content may be searched in conjunction with contextual keyword-based access control. In database based systems, a search undertaken in block 130 may include a complex query involving the consultation of multiple tables. A database may employ query planners to determine a sequence for a complex query, and these query planners may consider many aspects of the query, data, supporting indexes, related statistics, and other information. To support query planners, some implementations store predetermined privileges, generated, for example, in block 122, in a manner compatible with other query search terms. In such implementations, a query planner may undertake block 124, retrieve privileges. Alternately, a query may execute block 120, which may include blocks 122 and 124.

When privileges are predetermined and stored in block 140, cache privilege computation result, for access in a database-hosted search, some implementations may employ a representation in the following logical tuple:

$$C\ R\ W{:}n_{UW}$$

where $n_{UW}$ is a user index, in some implementations a natural number, for user U in context W. Alternatively or in addition, a group index $m_{GW}$ may be employed. In some examples, such a user or group index may be generated in block 142, generate user reference, as part of a tuple.

In addition, content index $m_{CW}$ references to content C may also be specified relative to the context W. For example:

$$W{:}\ m_{CW} R\ n_{UW}$$

In context W, a user specified by n may have the right R to content specified by m. When there is only a single possible right or when a right is otherwise implicit, the logical tuple may reduce to:

$$W{:}\ m_{CW} n_{UW}$$

Generally speaking, positive privileges may be stored. In such implementations, most content may not be accessible to a given user in a given context. In contrast, if most content is accessible, then negative privileges may be the default. In either case, a single privilege state may be stored.

In some implementations, tuples may be organized and/or stored in various ways. For example, in some implementations, a set of tuples may be partitioned based on context. Other partitioning and subpartitioning schemes may be possible. In some implementations, tuples may be partitioned to permit some degree of concurrent access to subsets of tuples.

Indexing may also be undertaken in response to patterns of tuple use. For example, because a context W and a user U may be known at the time of a query, an index may be keyed on W U (or $n_{UW}$) and optionally C (or $m_{CW}$). In some implementations, a set of tuples may be structured as a partitioned, index-organized table.

In some implementations, a structured set of tuples may support a property query such as: "Does content C have the value U for the property R in the context W?" In some implementations, block 130 may include searching for content having certain properties. In block 144, store privilege, a tuple may be generated and a database table (and/or index) storing tuple information may be partitioned based on content ranges, rights, contexts, or a combination.

Figure 2:
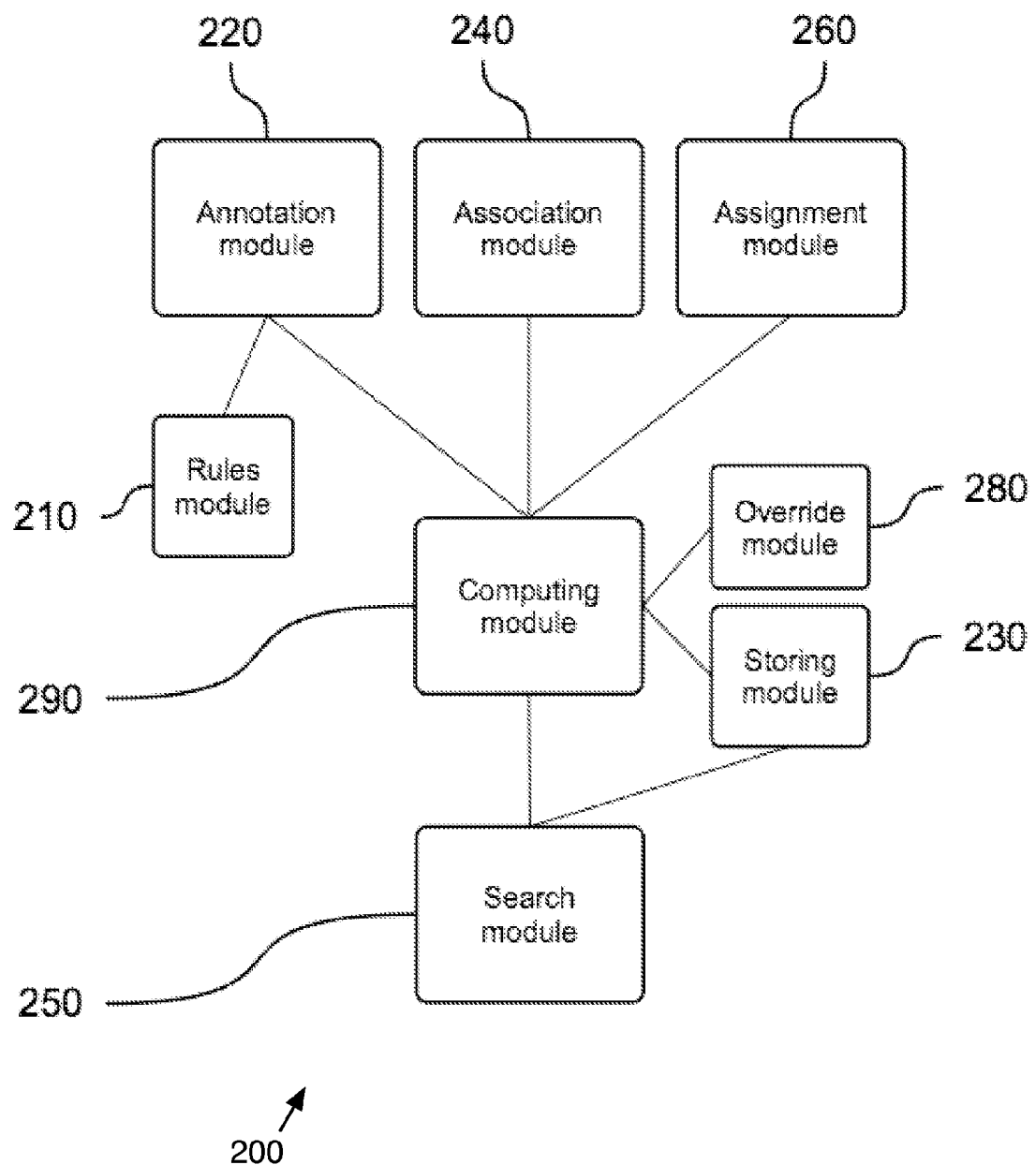
FIG. 2 illustrates an example contextual keyword-based access control system.

FIG. 2 illustrates of an example contextual keyword-based access control system 200 arranged in accordance with at least some examples of the present disclosure. System 200 may include any device or collection of devices capable of implementing access control in accordance with at least some examples of the present disclosure. For example, system 200 may include selected components of a computing device or a collection of computing devices such as a one or more personal computers, one or more servers, etc. or any combination thereof, configured in accordance with at least some examples of the present disclosure.

System 200 may include one or more operational modules, illustrated with logical partitions or blocks 210, 220, 230, 240, 250, 260, 280 and/or 290. Some examples of system 200 may include an annotation module 220 that may be configured to annotate content with one or more keywords. In some implementations, annotations or associations generated by annotation module 220 may be relative to a context. An association module 240 may be configured to associate groups with one or more keywords, and such associations may be relative to a context and/or optionally a right, such as "can see" or "can edit". An assignment module 260 may be configured to map groups to users. In some implementations, mappings undertaken by assignment module 260 may be relative to a context. Consequently, different contexts may have different group/user assignments. Further, a distinguished group or a distinguished user may specify public access. An override module 280 may be adapted to provide for direct content/group (or content/user) maps, which, in some implementations, may override what would otherwise be computed via keywords relationships. A compute module 290 may be arranged to determine which users have what right(s) to what content.

In some implementations predetermined and/or cache privileges generated by compute module 290 may be stored using storing module 230. Storing module 230 may be adapted to subsequently make such stored results available. Some implementations may generate a user index for users and/or a content index for content in the given context. Such references, which may require less space than a full user ID, may be qualified, directly or indirectly, with the context when the privilege is stored. When changes in data may change the results of a computation of privilege, storing module 230 may be configured to flush or replace a corresponding obsolete entry or entries.

Association module 220 may be arranged to use rules module 210 to derive implied keywords for content. Rules module 210 may be configured to consult keyword implication rules to compute implied keywords from previously obtained keywords in content annotations. In conjunction, a keyword extraction module (not shown) may generate keywords for content based on data associated with the content or based on the content itself.

A search module 250 may be configured to search for content in a given context for a given user with a given right (such as "can see") and/or with additional characteristics. Searches undertaken by search module 250 may be configured to seek content with certain keywords; metadata; occurrences of certain words, phrases, or symbols; or other features or characteristics.

FIG. 3 illustrates an example computer program product 300 arranged in accordance with at least some examples of the present disclosure. Program product 300 may include a signal bearing medium 302. Signal bearing medium 302 may include one or more instructions 304 that, when executed by, for example, a processor, may provide the functionality described above with respect to FIGS. 1 and 2. Thus, for example, referring to system 200, one or more of modules 210, 220, 230, 240, 250, 260, 280 and/or 290 may undertake one or more of the blocks shown in FIG. 1 in response to instructions 304 conveyed to the system 200 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 200 by an RF signal bearing medium 302, where the signal bearing medium 302 is conveyed by a wireless communications medium 310 (e.g., a wireless communications medium conforming with the 802.11 standard).

Figure 4:
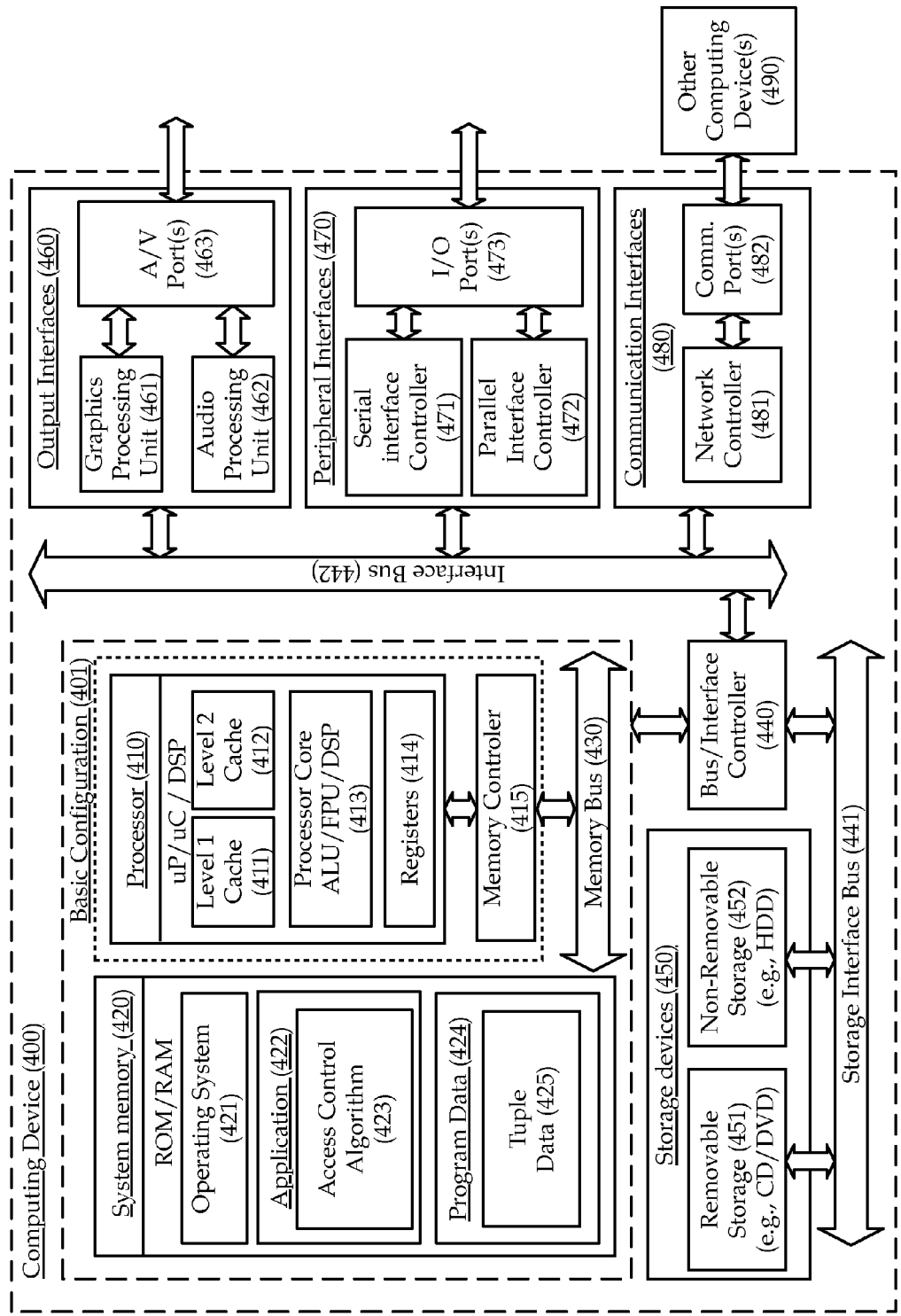
FIG. 4 is a block diagram illustrating an example computing device, all arranged in accordance with various examples of the present disclosure.

FIG. 4 is a block diagram illustrating an example computing device 400 that may be arranged for providing contextual keyword-based access control in accordance at least some examples of the present disclosure. In a very basic configuration 401, computing device 400 may include one or more processors 410 and system memory 420. A memory bus 430 may be used for communicating between the processor 410 and the system memory 420.

Depending on the desired configuration, processor 410 may be of any type including but not limited to a microprocessor (µP), a microcontroller (µC), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP Core), or any combination thereof. A memory controller 415 may also be used with the processor 410, or in some implementations the memory controller 415 may be an internal part of the processor 410.

Depending on the desired configuration, the system memory 420 may be of any type including but not limited to volatile memory (such as RAM), non-volatile memory (such as ROM, flash memory, etc.) or any combination thereof. System memory 420 may include one or more of an operating system 421, one or more applications 422, and program data 424. Application 422 may include an access control algorithm 423 that may be arranged to perform the functions as described herein including the functional blocks described with respect to the process of FIG. 1. Program Data 424 may include tuple data 425 which may be useful for implementing access control algorithm 423. In some example embodiments, application 422 may be arranged to operate with program data 424 on an operating system 421 such that implementations of contextual keyword-based access control may be provided as described herein. This described basic configuration is illustrated in FIG. 4 by those components within dashed line 401.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of device 400.

Computing device 400 may also include an interface bus 442 for facilitating communication from various interface devices (e.g., output interfaces, peripheral interfaces, and communication interfaces) to the basic configuration 401 via the bus/interface controller 440. Example output interfaces 460 include a graphics processing unit 461 and an audio processing unit 462, which may be configured to communicate to various external devices such as a display or speakers via one or more A/V ports 463. Example peripheral interfaces 460 include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication interface 480 includes a network controller 481, which may be arranged to facilitate communications with one or more other computing devices 490 over a network communication via one or more communication ports 482. A communication connection is one example of a communication media. Communication media may be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 400 may also be implemented as a personal computer including both laptop computer and non-laptop computer configurations.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. A method for contextual keyword-based access control, the method comprising:
   providing content;
   annotating the content with one or more searchable keywords;
   specifying the one or more searchable keywords using an implied keyword rule;
   assigning a user to a group configured to associate the content to a privilege;
   providing a context wherein the content is different from the context;
   associating a keyword of the one or more searchable keywords with the group and the context to associate both access control functions of the group and content searching functions of the keyword;
   determining a privilege for the user to access the content based on the association in the context of the keyword to the group and an association of the group to the privilege;
   searching the content using the one or more keywords wherein searching comprises filtering the content based on the determined privilege;
   storing the privilege as a tuple including elements specifying the content, the context, and the user, wherein the context comprises at least one of: an account, a topic, a qualification, a perspective, a region, or a constraint; and
   overriding the determined privilege in response to a direct association of the group with the content.

2. The method of claim 1, wherein storing the privilege comprises:
   generating a user index specifying the user; and
   generating the tuple, wherein the tuple includes the user index.

3. The method of claim 1, wherein storing the privilege comprises:
   generating a group index specifying the group; and
   generating the tuple, wherein the tuple includes the group index.

4. A method for contextual keyword-based access control, the method comprising:
   receiving a request to access content in a context, wherein the request includes information specifying a user, wherein the content has been annotated with an implied keyword wherein the implied keyword is derived based on an input of an original keyword and an implied keyword rule;
   mapping the context to a group;
   mapping the implied keyword to the context to associate both access control functions associated with the group and content searching functions of the implied keyword; and
   providing access to the content based on the user belonging to the group, wherein providing access comprises:
      determining a privilege for the user to access the content based on the association of the implied keyword to the group within the context and an association of the group to the privilege within the context;
      searching the content using the original keyword wherein searching comprises filtering the content based on the privilege;
      retrieving a privilege comprising a tuple identifying the content, the context, and the user, wherein the context comprises at least one of: an account, a topic, a qualification, a perspective, a region, or a constraint; and
      overriding the determined privilege in response to a direct association of the group with the content.

5. The method of claim 4, wherein retrieving the privilege comprises:
   determining an index specifying the user; and
   retrieving the privilege in response to the index.

6. The method of claim 4, wherein retrieving the privilege comprises:
   determining an index specifying the group; and
   retrieving the privilege in response to the index.

7. A system comprising:

a non-transitory machine readable medium having stored therein a plurality of instructions to perform contextual keyword-based access control, which, when executed by a computing platform comprising a processor, cause the computing platform to:

provide content;

identify one or more searchable keywords using an implied keyword rule;

annotate the content with the one or more searchable keywords;

associate content privileges to a group;

provide a context wherein the content is different from the context;

associate a keyword of the one or more searchable keywords with the group and the context to associate both content privileges of the group and content searching functions of the keyword;

assign a user to a group configured to associate the content to a particular content privilege;

store the particular content privilege as a tuple, wherein the tuple includes elements specifying the content, the context, and/or the user;

identify the particular content privilege for the user to access the content based on an association in the context of the searchable keyword to the group and an association of the group to the content privilege;

search and/or filter the content by using the one or more searchable keywords and filtering the content based on the particular content privilege; and override the particular content privilege in response to a direct association of at least one of the groups with the content.

8. An article comprising:

a non-transitory machine readable medium having stored therein a plurality of instructions, which, when executed by a computing platform comprising a processor, cause the computing platform to:

receive a request to access content in a context, wherein the request includes information specifying a user wherein the content has been annotated with an implied keyword wherein the implied keyword is derived based on an input of an original keyword and an implied keyword rule;

map the context to a group;

map the implied keyword to the context to associate both access control functions associated with the group and content searching functions of the implied keyword; and provide access to the content based on the user belonging to the group, wherein providing access includes:

determining a privilege for the user to access the content based on the association of the implied keyword to the group within the context and an association of the group to the privilege within the context;

retrieving a privilege, wherein the privilege comprises a tuple specifying the content, the context, and the user;

searching the content using the keyword, wherein the searching comprises filtering the content based on the privilege; and overriding the determined privilege in response to a direct association of the group with the content.

9. The article of claim 8, wherein retrieving the privilege comprises:

determining an index specifying the user; and retrieving the privilege in response to the index.

10. The article of claim 8, wherein retrieving the privilege comprises:

determining an index specifying the group; and retrieving the privilege in response to the index.

* * * * *